United States Patent [19]

Houllis

[11] Patent Number: 4,655,502
[45] Date of Patent: Apr. 7, 1987

[54] MULTI-ADJUSTABLE CUSHION FOR A SHOPPING CART

[76] Inventor: Cynthia A. Houllis, 756 Loquat Dr., Tarpon Springs, Fla. 33589

[21] Appl. No.: 676,325

[22] Filed: Nov. 29, 1984

[51] Int. Cl.$^4$ ............................................. A47C 31/00
[52] U.S. Cl. ............................ 297/229; 280/33.99 B
[58] Field of Search ................ 280/33.99 B, 33.99 A; 297/219, 229, 250, DIG. 6; 428/71; 224/155, 161, 36; 446/227

[56] References Cited

U.S. PATENT DOCUMENTS

| D. 254,409 | 3/1980 | Borucki | D6/339 |
|---|---|---|---|
| 1,538,538 | 5/1925 | Wood | 297/229 |
| 1,615,159 | 1/1927 | Bönner | 224/155 |
| 2,078,022 | 4/1937 | Roemer | 446/227 |
| 2,652,183 | 9/1953 | Hlivka | 297/229 |
| 2,679,282 | 5/1954 | Anderegg | 297/250 |
| 3,578,380 | 5/1971 | Jacobus | 297/229 |
| 3,637,454 | 1/1972 | Pavernik | 428/71 |
| 3,866,649 | 2/1975 | Bringmann | 446/227 |
| 4,108,489 | 8/1978 | Salzman | 297/250 |
| 4,188,065 | 2/1980 | Meeker | 297/219 |
| 4,204,695 | 5/1980 | Salzman | 280/33.99 B |
| 4,324,430 | 4/1982 | Dimas | 297/250 |
| 4,416,462 | 11/1983 | Thompson | 280/33.99 B |
| 4,540,219 | 9/1985 | Klinger | 446/227 |

*Primary Examiner*—John J. Love
*Assistant Examiner*—Karin L. Ferriter
*Attorney, Agent, or Firm*—Edwin E. Greigg

[57] ABSTRACT

This invention relates to a foldable seat cushion having at least one blank for use in the seat basket of a shopping cart. The device is constructed so that the back portion of the seat cushion can be adjusted for the width of the seat basket and affixed in position thereupon, while the front portion of the seat cushion may be rolled about the handle of the shopping cart and secured with an adjustable fastener. The invention includes a pair of apertures provided for legs of the child through the seat cushion, a seat belt for retention of the infant therein and accessory tethering straps for the application of toys or like objects for the entertainment of the child while seated upon the seat cushion.

1 Claim, 5 Drawing Figures

MULTI-ADJUSTABLE CUSHION FOR A SHOPPING CART

BACKGROUND OF THE INVENTION

1. Field of the Invention

The present invention relates to protective devices for use with infants and small children in shopping carts or the like.

2. Description of the Prior Art

The prior art discloses a number of seat cushion devices relating to padded child seats or safety seats for use in various seating situations to which a child is exposed. The most pertinent art would appear to be the patent to Thompson U.S. Pat. No. 4,416,462 which sets forth a pad cushion for a shopping cart seat which folds so that it can fit the front, bottom and back of the seat and may be padded. A provision for secure mounting and for multiple forms of adjustment of the cushion in use are provided.

The patent to Dimas et al U.S. Pat. No. 4,324,430 sets forth a chair-like infant seat for a shopping cart in which the seat is provided with straps for holding the seat in the shopping cart and for securing the baby to the seat.

The patent to Salzman U.S. Pat. No. 4,108,489 sets forth a collapsible seat which may be mounted in a shopping cart and upon which a baby may be placed; a seat belt is provided for retaining the baby relatively securely.

The patent to Salzman U.S. Pat. No. 4,204,695 sets forth a similar shopping cart seat to that shown in U.S. Pat. No. 4,108,489.

None of these seat cushion devices provide for an adjustable form of securing front and back portions of the cushion pad to the shopping cart seat back and the shopping cart handle, nor for providing that the device is adjustable for width and length to suit varying sizes of shopping carts and their baby seats.

The present invention is designed to provide a safer and cleaner environment within which a child may be retained in a shopping cart and provides a seat belt retention means for the child itself and accessory tethering straps for the provision of a toy or teething ring for use by the child so that the child may entertain itself while in the store with the parent. Naturally, the padding of the device provides for a more comfortable seating posture for the child and protects it from potential sharp edges on the cart. In addition the cushion device protects the infant or child from being seated upon a hot or cold cart surface depending upon the ambient temperature in the store when used.

SUMMARY OF THE INVENTION

It is an object of the present invention to provide a multi-adjustable cushioned pad device designed for use in a shopping cart.

It is another object of the present invention to provide a removable cushion which is adjustable in both width and length and capable of securement to the basket seat and handle of a shopping cart.

It is a still further object to provide a padded cushion device which is washable to remove any continents picked up from the shopping cart in use or as may be required to cleanse the cushioned pad device after use by the child.

It is a still further object of the invention to provide a cushion pad device for a shopping cart which is constructed similarly to a paper diaper and is disposable in the same fashion.

It is still another object of the invention to provide for retention means on a cushioned seat pad for the child and for tethering means for provision of entertainment devices for the child when the seat cushion is in use.

Other objects and advantages provided by the present invention will become more clear from the following description of the drawings and the description of the preferred embodiment.

DESCRIPTION OF THE PREFERRED EMBODIMENT

Figures 1, 2:
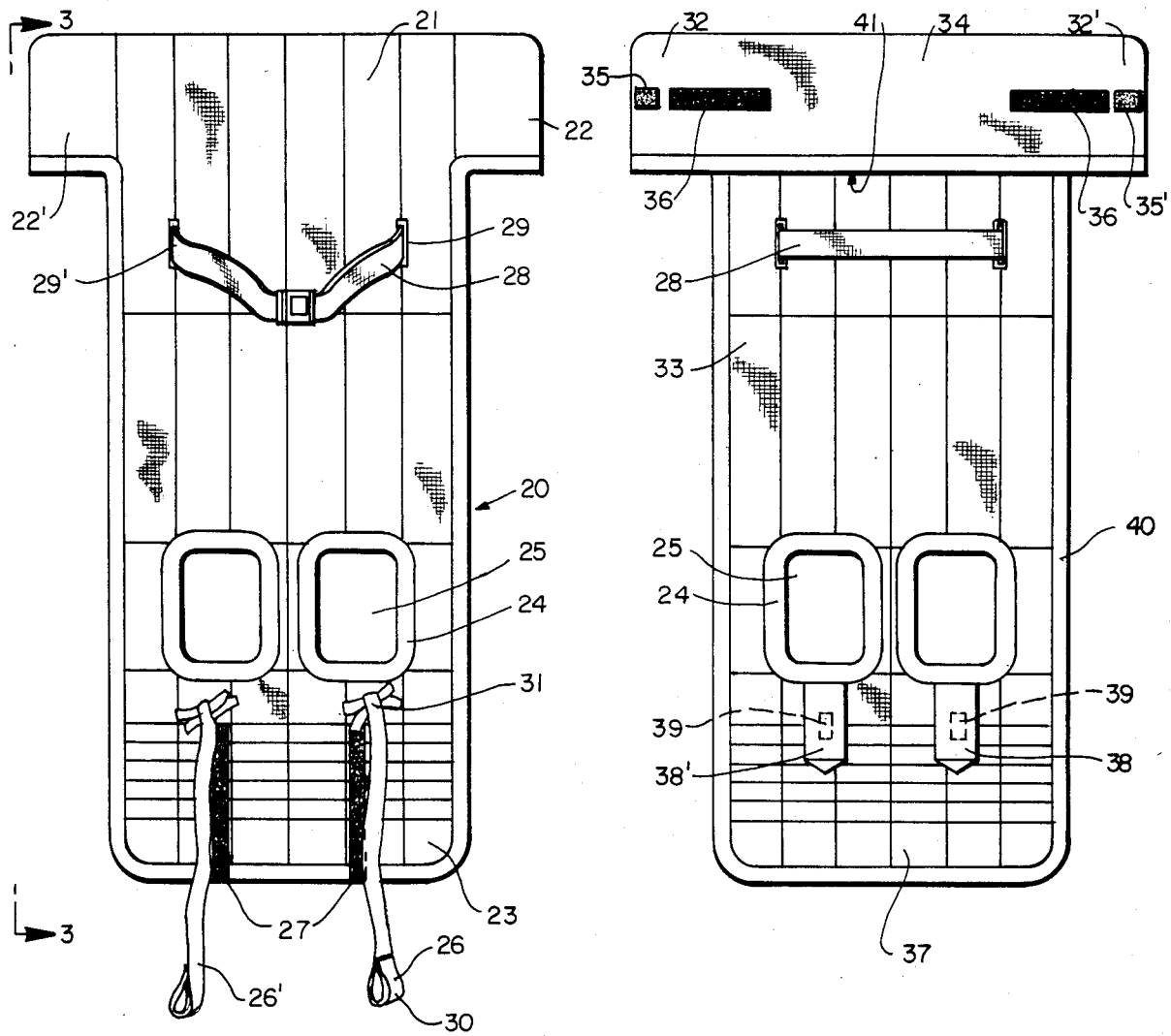
FIG. 1 is a top plan view of the padded seat cushion for the shopping cart prior to its being placed therein.
FIG. 2 is a bottom plan view of the seat cushion device for a shopping cart, again prior to its being installed therein.

The multi-adjustable seat cushion device for a shopping cart, which forms the basis of the present invention, comprises an elongated, foldable blank comprised of at least one layer of flexible material. The seat cushion device is indicated generally as 20 in FIG. 1. In the preferred embodiment of the invention, the single blank above mentioned becomes two blanks with padding applied therebetween and sealed at their adjoining edges. The multi-adjustable seat cushion device 20 is provided with a top portion 21 provided with laterally elongated winged portions 22, 22', which extend beyond the width of the remainder of the seat cushion device. At the opposite extremity of the seat cushion device there is provided an end 23 which if padded, is arranged to flex about the handle of a shopping cart via lateral channel tufting of the cushioned body in that area. Similar flexibility in the end portion 23 of the foldable seat device could be achieved by deleting the padding from that area so that the device may be easily wrapped into a tubular covering for securing about the handle of the shopping cart.

The seat cushion device is provided with a means 24 defining apertures 25 in the seat cushion device, through which apertures the infant or child's legs would pass upon installation in working position in the shopping cart. The preferred embodiment of the invention provides for attachable straps 26, 26' to which toys or teething devices may be affixed for entertaining the child while seated in the shopping cart. The numeral 27 indicates a pair of releasable fastening means, preferably hook fasteners, which cooperate with complemental loop fastener means on the opposite side of the seat cushion, device which will be described later. The cushioning pad device is provided with a seat belt retention means 28 which extends through a pair of apertures 29 provided in the top portion 21 of the seat cushion. With this seat belt arrangement the child may be restrained when seated as a user of the device in the shopping car. Referring again to the tethering means, a loop arrangement 30 is provided for retaining the toy or teething ring while a releasable fastener such as a snap fastener is provided at 31 for retaining the tethering device on the lower portion of the seat cushion.

Referring now to FIG. 2, which depicts a further similarly-shaped blank (if multi-layered) or the reverse side of the seat cushion device, there is shown at 32, 32' the opposite side of the winged portions 22, 22', to each of which are applied in adjacent relationship a releasable and adjustable fastening means, again perhaps hook and loop fasteners indicated at 35 and 36. In the embodiment depicted a hook fastener portion is provided at 35 and a somewhat larger loop fastener portion is provided at 36 in alignment therewith inwardly thereof upon the wing portion 32, 32'. The numeral 41 indicates a pocket or slit which runs along the lower extremity of the top portion for the full width of the flaps 32, 32'. This pocket 41 allows the top portion 21 of the seat cushion to be slipped over the basket portion of the shopping cart seat so as to be retained thereon. After placing the pocket of the top portion of the seat cushion over the basket seat back of the shopping cart, the winged portion 32, 32' may be folded over inwardly so that the releasable fasteners are made to contact and snuggly hold the seat cushion device in place upon the basket seat back. There is further shown in this FIG. 2 a central portion 33 of the seat cushion device and the opposite side of the means 24 defining apertures 25, adjacent a lower edge of which apertures are provided flaps 38, 38' on the underside of which are provided further releasable fastener means 39, 39', again such as hook and loop fastener means, such as "Velcro".

When the seat cushion device is seated into the basket seat of the shopping cart, the lower portion of the seat cushion device, the portion indicated by numerals 23 and 37 respectively denoting the two sides of the device, extend forwardly with lower portion 23 extending over the handle of the shopping cart and wrapping around the handle until the leading edge to which the releasable fastener means 27 are applied is brought into proximity with tabs 38, 38', at which point the releasable fastener 27 may be brought into engagement with the complemental means 39, 39' on the tabs 38, 38'. In that fashion, the seat cushion device has now been made snug at its back over the basket seat back and also snuggly resides over the handle of the shopping cart so as to hold the seat cushion device in place and serve as a cushioned protection means for the child occupying the seat.

Figure 3:
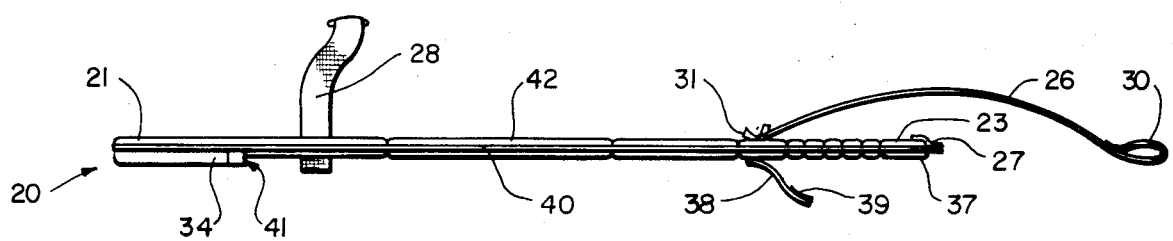
FIG. 3 is a side elevational view of the cushioned pad for use in the shopping cart, taken along line 3—3 of FIG. 1.

FIG. 3 shows a side elevational view of the seat cushion device, taken along line 3—3 of FIG. 1. In this view is shown the seat cushion device 20 and its upper and lower portions 21, 23 for a first layer of material and 34, 37 for a second layer of material, respectively. An edge sealing means at 40 such as heat sealing or sewn stitches, is shown, while padding is depicted at 42. A tab 38 is shown extending below the seat cushion device from the area adjacent the means defining the aperture, not shown in this view, to which is applied releasable fastener means 39 for cooperation with releasable fastener means 27 applied at the extremity of lower portion 23. The tethering means 26 and its attachment 31 and loop means 30 are shown. The seat belt 28 and the pocket 41 which is used to secure the seat on the shopping cart seat back are indicated.

Figure 4:
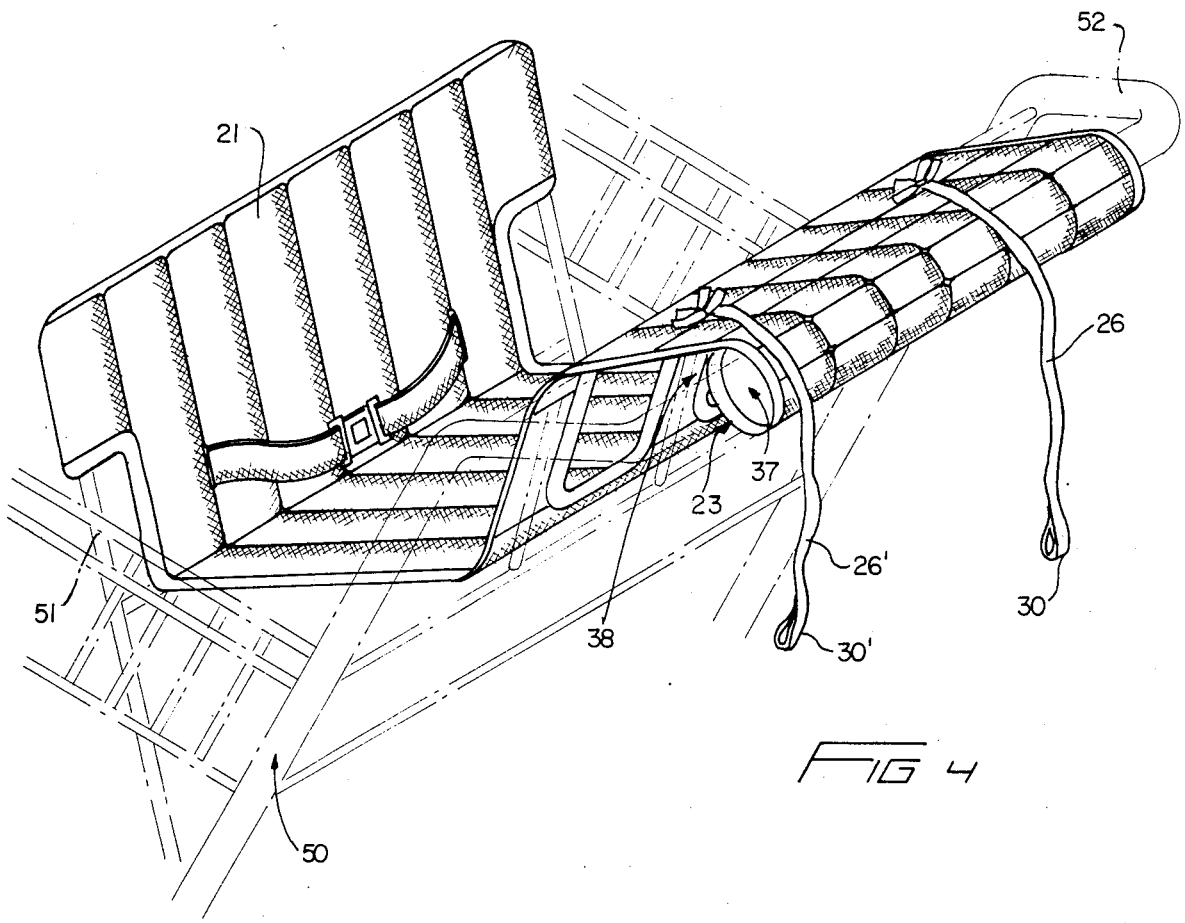
FIG. 4 is a front perspective view of the seat cushion device showing it in its as installed position in a shopping cart seat.

FIG. 4 shows a perspective view of the seat cushion as it would be installed in a seat of a shopping cart. The top portion 21 forming the seat back of the cushion device is shown in its installed position, wherein the flap pocket 41 has been slipped over the shopping cart seat back and the outward wings of the seat cushion folded over upon themselves and engaged with releasable fasteners to secure it in place laterally. The opposite extremity 23, 37 respectively indicating a first side and a second side of the lower portion of the cushion have been wrapped over and around the shopping cart handle and the releasable fasteners 27, 39 (not shown here) have been brought into engagement to retain the rolled lower portion of the seat cushion in place about the handle. The basket is depicted generally by the numeral 50 and the seat back for the typical shopping cart by the numeral 51 while its handle is enumerated as 52.

Figure 5:
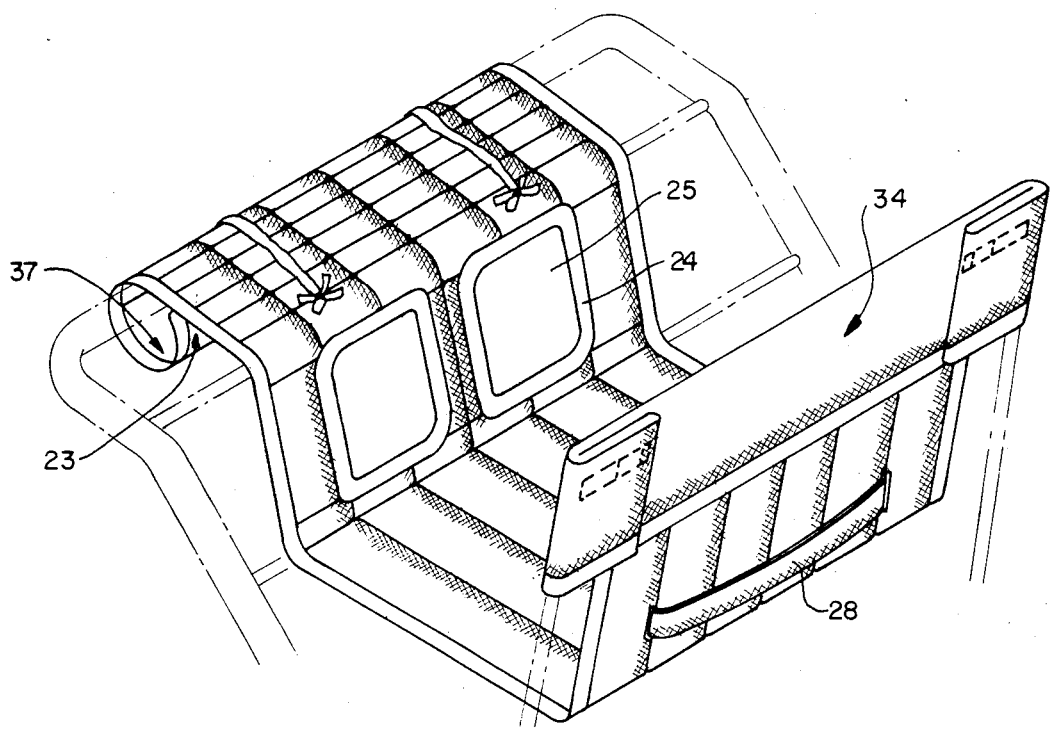
FIG. 5 is a rear perspective view of the cushion pad device for a shopping cart showing it in its as installed position in a shopping cart seat.

Viewing FIG. 5, a perspective view taken in the opposite direction, one can see the "as installed" seat cushion from the rear and view the end flaps 22, 32 and 22', 32' which have been folded over and secured via a releasable fastener means so as to snugly position the seat cushion device in the basket seat. The position of the means 24 defining apertures 25 for the child or infant's legs with respect to the back and rolled lower portion over the handle is indicated.

The present invention comprehends the use of woven fabric material from which the seat cushion in accordance with the invention may be constructed, having either a single or a double ply, and in the latter case either padding or a waterproof liner therebetween. In addition, the invention comprehends the use of plastic or other synthetic layers for the blank used in single or double ply arrangement; furthermore, a preferred embodiment of the device would provide for a plastic lower layer to which was applied an absorbent layer of disposable diaper type absorbent paper material, provided for the absorption of wetness and spills, to which would be applied in the fashion of a modern disposable diaper a top layer which would allow the penetration of fluids into the padded absorbent layer while providing a surface that was relatively resistant to being torn and soft to the touch. When constructed in the foregoing fashion, the user could procure the seat cushion pad devices inexpensively use them and throw them away after use, thereby avoiding the need to wash them regularly as would be required with normal fabric materials.

Taken with the disclosure of the subject matter of this invention, it should be understood that any substitutions, or modifications or variations of this device are possible in view of the above teachings, therefore it is to be understood that the invention as taught and described is only limited by the breadth and scope of the claim.

What is claimed and desired to be secured by Letters Patent of the United States is:

1. A foldable device for use in a shopping cart comprising an elongated first blank of material having a length and a width with inner and outer surfaces and parallel side portions, said side portions terminating in top and bottom end portions, said top end portion further constructed and arranged to have oppositely extending foldable wing areas which extend beyond said width, plural openings in said blank lying in a plane near said bottom end portion, each of said plural openings having a first edge zone positioned adjacent a line extending medially of said length of said blank and said openings being spaced substantially equally from each said parallel side portions, said plural openings further having lower edge areas, planar sheets of cushioning material abutting said inner surface of said first blank, said cushioning material further extending at least from said first edge zone of said equally spaced openings to said top end portion of said blank and said cushioning material further extending at least from said lower edge areas of said pair of openings to said bottom end portion of said blank and a second elongated blank of material duplicative of said first blank having inner and outer surfaces, said second elongated blank arranged to be secured to said first blank thereby encompassing said cushioning material to form a foldable seat cushion device having a front wall and a back wall, pocket formed along said back wall extending downwardly from a top edge, said pocket having the same width as said wing areas so that said pocket will adjust to different sized shopping cart upon which it fits, a pair of flap members affixed to said back wall and extending longitudinally thereof from said lower edge of said plural openings toward said bottom end portion, means on said front wall of said foldable seat cushion device arranged for attachment to said flap members on said back wall of said foldable seat cushion device between said plural openings and said bottom end when said bottom end of said foldable seat cushion device is rotated 180°–360° toward said back wall juxtaposed said flap members.

* * * * *